3,132,055
ANTIRUSTING SURFACE TREATING METHOD FOR IRON AND STEEL PRODUCTS
Tadashi Tanaka, Todamachi, Kitaadachi-gun, and Saburo Ayusawa, Tokyo, Japan, assignors to Yawata Iron and Steel Co., Ltd., Tokyo, Japan
No Drawing. Filed July 24, 1961, Ser. No. 125,962
Claims priority, application Japan July 25, 1960
13 Claims. (Cl. 148—6.16)

This invention relates to the surface treatment of iron and steel products. More particularly it relates to a method of preventing rust formation in steel plates, galvanized iron plates or tin plates.

Research has been performed on the surface treatment of iron and steel products with a view towards surface protection of metals by use of a water-soluble, film-forming material. The results are set forth in application Serial No. 83,149, filed on January 17, 1961. The present invention describes means for protecting a metal surface and relates to a surface treating method for iron, plated iron and steel products.

That is to say, according to the present invention, an iron plate to be treated is painted on its surface with a water-soluble surface treating solution composed mainly of a maleic acid copolymer soluble in an acidic aqueous solution and a water-soluble hexavalent chromium compound with the addition, as required, of a water-soluble phosphoric acid compound or a water-soluble organic highly polymerized compound thereto and is then heated and dried so that a coating film is produced.

An object of the present invention is to provide a white rust preventing surface for galvanized iron plates and a red rust preventing surface for ordinary steel plates and tin plates.

The concentration of maleic acid copolymer to be used in the present invention is 0.1 to 40% by weight. The concentration of the chromium ion is in the range of 0.01 to 20%. Galvanized iron plates are treated by dip-painting, flow-painting, blow-painting or roller-painting in the usual manner, and are naturally or forcibly dried so that a strong anticorrosive coating film may be formed.

According to the present invention, an insoluble uniform continuous antirusting film is formed by coating a metal with a solution of a maleic acid copolymer and a water-soluble hexavalent chromium compound. The chromium compound is added, so that upon ionization, a surface treating effect is realized on the metal surface and a superior film of the maleic acid copolymer is obtained. This film adheres well to the surface of the metal, however, it has been found that by the addition of a water-soluble phosphoric acid or a highly polymerized organic compound, an unexpectedly durable film is obtained.

The maleic acid copolymers soluble in an acidic aqueous solution suitable for use in the present invention are for example, polyvinyl methyl ether (anhydrous) maleic acid copolymers, polyvinyl acetate maleic acid copolymers and polyethylene maleic acid copolymers.

In the present invention a solution composed of a water-soluble hexavalent chromium compound is used to treat the surface of the metal.

Additives which may be used to enhance the film properties are water-soluble phosphoric acid compounds and water soluble organic highly polymerized compounds such as members from the polyvinyl alcohol series, poly acrylic and methacrylic acid series, polymethylol melamine and urea series, polyvinyl pyrrolidone series, polymethylol phenol series, methyl cellulose series, soluble starch and their derivatives, lower alcohols and various nonion, cation and anion active agents.

These additives not only render the surface more corrosion resistant, but improve the weatherproofness and durability of the coated metal and also, the stability of the treating solution and its wettability for metals.

As evident from the above explanation, the treating solution in the present invention will improve the corrosion resistance of not only galvanized iron plates, but also steel plates and such plated metals as aluminum and tin. When a metal surface was treated by the method of the present invention to obtain a deposition of 10 mg./cm.$^2$, the metal surface resisted corrosion for more than 200 hours until the generation of white rust on a galvanized iron plate, more than 80 hours until the generation of red rust on a steel plate and more than 100 hours until the generation of red rust on a tin-plated iron plate were shown in anticorrosiveness tests by salt water spraying according to the A.S.T.M. standards.

Examples of the present invention are as follows:

*Example 1*

0.5 part of chromic anhydride was added to 10 parts of an aqueous solution of a polyvinyl acetate maleic acid copolymer (50%). The solution was diluted with water until it was 100 parts so as to be a treating solution. A galvanized iron plate was dipped in this treating solution and was then dried. The thus obtained treated plate had a lustrous colorless transparent appearance having a little interference color. It showed an anticorrosiveness of 180 hours until white rust was generated by salt water spraying.

*Example 2*

0.8 part of ammonium chromate, 100 parts of water and 0.01 part of a nonion active agent were added to 3 parts of a water-soluble polyethylene maleic acid copolymer (of a trade name of DX–840) of Monsanto Chemical Company, U.S.A. so as to prepare a uniform solution. A galvanized iron plate was treated with the solution. Forced drying treatment was carried out at 150° C. for 30 seconds, at 300° C. for 10 seconds and at 400° C. for 3 seconds. Then the same anticorrosiveness as in Example 1 was obtained.

*Example 3*

An aqueous solution of 5% polyvinyl methyl ether maleic acid copolymer was prepared and chromic anhydride was added thereto to prepare a treating solution. The results of salt water spray tests when steel plates, tin plates and galvanized iron plates were treated with the solution were as follows:

| Added CrO$_3$ | 0.4%, hours | 1.0%, hours | 2.0%, hours | Not treated |
|---|---|---|---|---|
| Steel plates | 3 | 40 | 80 | 10 minutes. |
| Tin plates | 40 | 80 | 100 | 2 hours. |
| Galvanized iron plates (white rust). | 200 | | | 1 hour. |

*Example 4*

A treating solution was prepared by adding 2 parts of chromium chromate and 1 part of phosphoric acid to the solution of 5% maleic acid copolymer in Example 3. A steel plate was treated in the solution at 70° C., was withdrawn and was then rolled and dried. The thus obtained treated steel plate was high in anticorrosiveness and the adhesiveness of paint thereto was also high.

*Example 5*

100 parts of an aqueous solution were prepared of 3 parts of a polyvinyl alcohol (of a hydrolyzed degree of 88%), 2 parts of the maleic acid copolymer in Example 3 and 3 parts of ammonium chromate. A steel plate was dipped in this treating solution and was dried.

*Example 6*

A treating solution was prepared by adding 30 parts of an aqueous solution of 10% polyacrylic acid and 2 parts of chromic anhydride to 100 parts of the aqueous solution of 5% maleic acid copolymer in Example 3. A steel plate was treated with the treating solution.

*Example 7*

An aqueous solution of 10% polyvinyl acetate maleic acid copolymer was prepared. To 100 parts thereof were added 4 parts of a solution of 50% polymethylol melamine methyl ether and 0.2 part of sodium dichromate. A tin plated iron plate was treated with the solution.

The treated metal plates obtained in the above Examples 5, 6 and 7 showed no rust generation in more than 50 hours in anticorrosiveness tests with salt water spraying. Excellent results were obtained also in adhesiveness when they were painted with finishing coat paints.

*Example 8*

To 100 parts of the aqueous solution of 5% water soluble copolymer in Example 3 were added 20 parts of an aqueous solution of 10% polyacrylamide (of a molecular weight of about 500,000), 0.5 part of chromic anhydride and 150 parts of water to prepare a treating solution. A galvanized iron plate was dipped in this treating solution and was then dried with hot wind at 400° C. for 3 seconds. The thus obtained treated plate was very high in anticorrosiveness, durability, finish coat adhesiveness, workability and wear resistance.

What we claim is:

1. A method for surface treating a metallic article to produce a corrosion-resistant film thereon by applying thereto water-soluble film-forming material which comprises coating the surface of a member selected from the group consisting of iron, galvanized iron, zinc, tin plated iron, tin and steel with an acidic aqueous film-forming solution consisting essentially of maleic acid copolymer selected from the group consisting of polyvinyl methyl ether-maleic acid copolymer, polyethylene-maleic acid copolymer and polyvinyl acetate-maleic acid copolymer, and water-soluble hexavalent chromium compound and water, and drying the thus-coated article to form a corrosion-resistant film thereon.

2. A method as defined in claim 1 wherein said maleic acid copolymer is present in said solution in an amount of from 0.1 to 40% by weight and said water-soluble hexavalent chromium compound is present in an amount of from 0.1 to 20% by weight.

3. A method as defined in claim 1 wherein phosphoric acid is contained in said aqueous film-forming solution.

4. A method for surface treating a galvanized iron plate to produce a corrosion-resistant film thereon which comprises coating said galvanized iron plate with a solution consisting essentially of polyvinyl acetate-maleic acid copolymer, chromic anhydride and water and drying the thus-coated plate to form a corrosion-resistant film thereon.

5. A method for surface treating a galvanized iron plate to produce a corrosion-resistant film thereon which comprises coating said galvanized iron plate with a solution consisting essentially of polyethylene-maleic acid copolymer, ammonium chromate and water and drying the thus-coated plate to form a corrosion-resistant film thereon.

6. A method for surface treating a steel plate to produce a corrosion-resistant film thereon which comprises coating said steel plate with a solution consisting essentially of polyvinyl methyl ether-maleic acid copolymer, chromic anhydride and water and drying the thus-coated plate to form a corrosion-resistant film thereon.

7. A method for surface treating a tin plate to produce a corrosion-resistant film thereon which comprises coating said tin plate with a solution consisting essentially of polyvinyl methyl ether-maleic acid copolymer, chromic anhydride and water and drying the thus-coated plate to form a corrosion-resistant film thereon.

8. A method for surface treating a galvanized iron plate to produce a corrosion-resistant film thereon which comprises coating said galvanized iron plate with a solution consisting essentially of polyvinyl methyl ether-maleic acid copolymer, chromic anhydride and water and drying the thus-coated plate to form a corrosion resistant film thereon.

9. A method for surface treating a steel plate to produce a corrosion-resistant film thereon which comprises coating said steel plate with a solution consisting essentially of polyvinyl methyl ether-maleic acid copolymer, chromium chromate, phosphoric acid and water, and drying the thus-coated plate to form a corrosion-resistant film thereon.

10. A method for surface treating a steel plate to produce a corrosion-resistant film thereon which comprises coating said steel plate with a solution consisting essentially of polyvinyl methyl ether-maleic acid copolymer, ammonium chromate, polyvinyl alcohol and water, and drying the thus-coated plate to form a corrosion-resistant film thereon.

11. A method for surface treating a steel plate to produce a corrosion-resistant film thereon which comprises coating said steel plate with a solution consisting essentially of polyvinyl methyl ether-maleic acid copolymer, polyacrylic acid, chromic anhydride and water, and drying the thus-coated plate to form a corrosion resistant film thereon.

12. A method for surface treating a tin coated iron plate to produce a corrosion-resistant film thereon which comprises coating said tin coated iron plate with a solution consisting essentially of polyvinyl acetate-maleic acid copolymer, sodium dichromate, polymethylol melamine methyl ether and water, and drying the thus-coated plate to form a corrosion-resistant film thereon.

13. A method for surface treating a galvanized iron plate to produce a corrosion-resistant film thereon which comprises coating said galvanized iron plate with a solution consisting essentially of polyvinyl methyl ether-maleic acid copolymer, chromic anhydride, polyacrylamide, and water and drying the thus-coated plate to form a corrosion-resistant film thereon.

References Cited in the file of this patent

UNITED STATES PATENTS

| | | |
|---|---|---|
| 2,636,257 | Ford | Apr. 28, 1953 |
| 2,756,163 | Herrick et al. | July 24, 1956 |
| 2,978,356 | Gomsi | Apr. 4, 1961 |

FOREIGN PATENTS

| | | |
|---|---|---|
| 590,692 | Canada | Jan. 12, 1960 |